United States Patent
Khan

(10) Patent No.: US 7,787,546 B2
(45) Date of Patent: Aug. 31, 2010

(54) APPARATUS AND METHOD FOR FT PRE-CODING OF DATA TO REDUCE PAPR IN A MULTI-CARRIER WIRELESS NETWORK

(75) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1131 days.

(21) Appl. No.: 11/374,928

(22) Filed: Mar. 14, 2006

(65) Prior Publication Data

US 2006/0227888 A1    Oct. 12, 2006

Related U.S. Application Data

(60) Provisional application No. 60/668,797, filed on Apr. 6, 2005.

(51) Int. Cl.
*H04K 1/10* (2006.01)

(52) U.S. Cl. .................. 375/260; 375/261; 375/232; 375/340; 708/403; 708/405; 708/821

(58) Field of Classification Search .......... 375/260, 375/340, 269, 279, 362, 355, 308, 334, 232–233, 375/261, 141; 708/403–405, 44, 8, 21, 5, 708/821; 455/456.5, 456.6, 524; 370/466–469, 370/491, 485, 210, 464, 500
See application file for complete search history.

(56) References Cited

U.S. PATENT DOCUMENTS

| | | | |
|---|---|---|---|
| 6,459,723 B1 * | 10/2002 | Kim et al. | 375/146 |
| 2002/0086708 A1 * | 7/2002 | Teo et al. | 455/561 |
| 2003/0123383 A1 * | 7/2003 | Korobkov et al. | 370/208 |
| 2004/0028148 A1 * | 2/2004 | Dowling | 375/296 |
| 2004/0076239 A1 * | 4/2004 | Yu et al. | 375/260 |
| 2005/0286648 A1 * | 12/2005 | Feng et al. | 375/260 |

\* cited by examiner

*Primary Examiner*—David C Payne
*Assistant Examiner*—Rahel Guarino

(57) ABSTRACT

A subscriber station for use in a wireless network capable of communicating according to a multi-carrier protocol, such as OFDM or OFDMA. The subscriber station comprises a size M Fourier Transform (FFT or DFT) block for receiving input symbols and generating M FT pre-coded outputs and a size N inverse Fourier Transform (IFFT or IDFT) block capable of receiving N inputs, where the N inputs include the M FT pre-coded outputs from the size M FT block. The size N IFT block generates N outputs to be transmitted to a base station of the wireless network. The input symbols comprise user data traffic to be transmitted to the base station. The size N IFT block also receives signaling and control information on at least some of N-M inputs. The FT pre-coding generates a time-domain signal that has a relatively lower peak-to-average power ratio (PAPR).

27 Claims, 12 Drawing Sheets

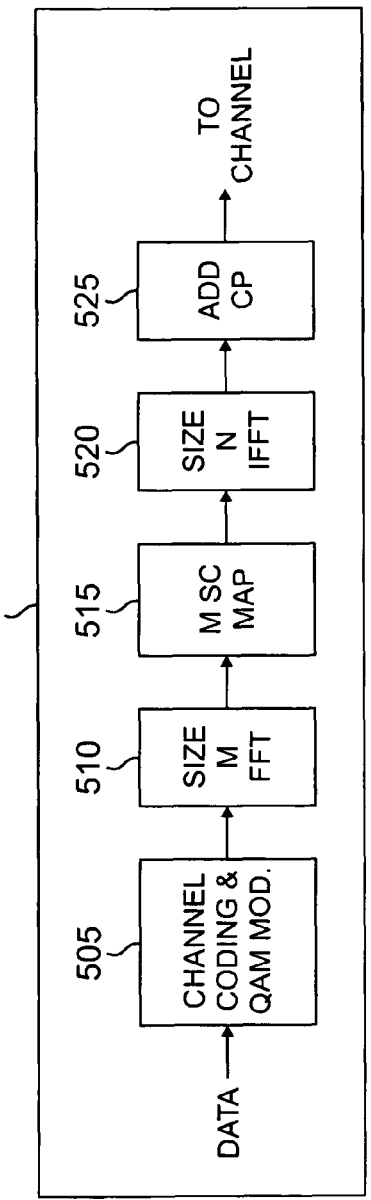
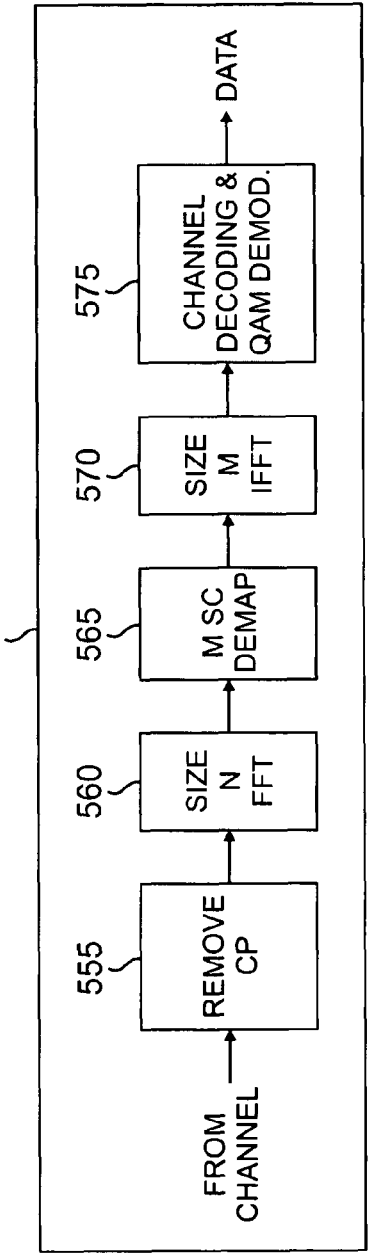
FIG. 5A
FIG. 5B

US 7,787,546 B2

APPARATUS AND METHOD FOR FT PRE-CODING OF DATA TO REDUCE PAPR IN A MULTI-CARRIER WIRELESS NETWORK

CROSS-REFERENCE TO RELATED APPLICATION AND CLAIM OF PRIORITY

The present application is related to U.S. Provisional Patent No. 60/668,797, filed Apr. 6, 2005, entitled "Power Efficient OFDM Wireless Communication System". U.S. Provisional Patent No. 60/668,797 is assigned to the assignee of this application and is incorporated by reference as if fully set forth herein. The present application hereby claims priority under 35 U.S.C. §119(e) to U.S. Provisional Patent No. 60/668,797.

CROSS-REFERENCE TO RELATED APPLICATION(S)

The present application is related to U.S. patent application Ser. No. 11/374,863, entitled "Apparatus and Method for FT Pre-Coding of Data and Control Signals To Reduce PAPR in a Multi-Carrier Wireless Network," filed concurrently herewith. Application Ser. No. 11/374,863 is assigned to the assignee of this application. The subject matter disclosed in application Ser. No. 11/374,863 is incorporated by reference as if fully set forth herein.

TECHNICAL FIELD OF THE INVENTION

The present application relates generally to wireless communications and, more specifically, to a mechanism for FFT pre-coding of data to reduce peak-to-average power ratio (PAPR) in a multi-carrier wireless network.

BACKGROUND OF THE INVENTION orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi), IEEE-802.16 (e.g., WiMAX), digital audio broadcast (DAB), and digital video broadcast (DVB). This technology is also used for wireless digital audio and video broadcasting.

Conventional power amplifiers for amplifying multi-carrier signals are relatively expensive parts of a communication system. A key design parameter for OFDM and OFDMA power amplifiers is the requirement to minimize the generation of adjacent channel power (ACP) noise. ACP noise results from signal distortion caused by operation of power amplifier components in non-linear regions of the input-output characteristic such as when the power amplifier enters saturation. This distortion produces undesired spectral components in adjacent transmission channels.

Power amplifiers are more linear at lower input signal levels. Large input signals tend to drive a power amplifier into saturation. Thus, weaker signals experience less distortion and have lower ACP noise. However, a sudden large signal peak still results in distortion and ACP noise. This is especially problematic in systems that have large peak-to-average power ratios (i.e., high crest factors), such as OFDM and OFDMA systems. To avoid this, power amplifiers often operate in "back-off" mode (i.e., reduced input signal) in order to accommodate large signal peaks. However, operating in back-off mode requires the use of devices with higher power ratings which adds to system design, development and manufacturing costs. Furthermore, it may be inefficient and may generate excessive heat.

Therefore, there is a need for improved OFDM and OFDMA transmission system that minimize amplifier peak-to-average power ratio (PAPR) without suffering performance degradation.

SUMMARY OF THE INVENTION

A subscriber station is provided for use in a wireless network capable of communicating according to a multi-carrier protocol, such as OFDM or OFDMA. In one embodiment, the subscriber station comprises a size M Fourier Transform (FT) block capable of receiving input symbols and generating therefrom M FT pre-coded outputs; and a size N inverse Fourier Transform (IFT) block capable of receiving N inputs, where the N inputs include the M FT pre-coded outputs from the size M FT block. The size N IFFT block generates therefrom N outputs to be transmitted to a base station of the wireless network. The size M FT block and the size N IFT block are one of: 1) a size M Fast Fourier Transform (FFT) block and a size N inverse Fast Fourier Transform (IFFT) block; and 2) a size M Discrete Fourier Transform (DFT) block and a size N inverse Discrete Fourier Transform (IDFT) block. The input symbols comprise user data traffic to be transmitted to the base station. The size N IFT block also receives signaling and control information on at least some of the other N-M inputs. Advantageously, the FT pre-coding performed by the size M FT block generates a time-domain signal that has a relatively lower peak-to-average power ratio (PAPR).

A method also is provided for reducing the peak-to-average power ration (PAPR) of a radio frequency signal transmitted by a subscriber station to a base station of a wireless network. The method comprises the steps of receiving input symbols to be transmitted to the base station; performing a size M Fourier Transform (FT) operation on the received input symbols to thereby generate M FT pre-coded outputs; and performing a size N inverse Fourier Transform (IFT) operation on N inputs, where the N inputs include the M FT pre-coded outputs. The IFT operation generates N outputs to be transmitted to the base station. The size M FT operation and the size N IFT operation are one of: 1) a size M Fast Fourier Transform (FFT) operation and a size N inverse Fast Fourier Transform (IFFT) operation; and 2) a size M Discrete Fourier Transform (DFT) operation and a size N inverse Discrete Fourier Transform (IDFT) operation.

In another embodiment, a base station is provided for use in a wireless network capable of communicating with subscriber stations according to a multi-carrier protocol. The base station comprises down-conversion circuitry for receiving incoming radio frequency signals from the subscriber stations and generating a baseband signal; a size N Fourier Transform (FT) block for receiving the baseband signal on N inputs and performing an FT operation to generate N outputs; and a size M Inverse Fourier Transform (IFT) block for receiving M of the N outputs of the size N FT block and performing an IFT operation on the M outputs to generate a plurality of data symbols transmitted by a first one of the subscriber stations. The size N FT block and the size M IFT block are one of: 1) a size N Fast Fourier Transform (FFT) block and a size M inverse Fast Fourier Transform (IFFT) block; and 2) a size N Discrete Fourier Transform (DFT) block and a size M inverse Discrete Fourier Transform (IDFT) block.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5A is a high level block diagram of a subscriber station that implements FFT pre-coding according to one embodiment of the present disclosure;

FIG. 5B is a high level block diagram of a base station that supports FFT pre-coded data according to one embodiment of the present disclosure;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

A transmission technique is disclosed for reducing the peak-to-average power (PAPR) ratio—or crest factor—of the transmitted waveforms for multi-carrier signals, such as orthogonal frequency division multiplexing (OFDM) or orthogonal frequency division multiple access (OFDMA) signals. Reducing PAPR provides improved power amplifier efficiency, reduced heat dissipation requirements, smaller heat sinks, reduced power supply load, and lower cost for wireless base stations and subscriber stations. In the descriptions that follow, it shall be assumed generally that transmitters and receivers are operating in OFDMA mode. However, this embodiment should not be construed to limit the scope of the disclosure. In alternate embodiments, the transmitters and receivers may operate in OFDM mode or another multi-carrier mode without departing from the principles of the disclosure.

Figure 1:
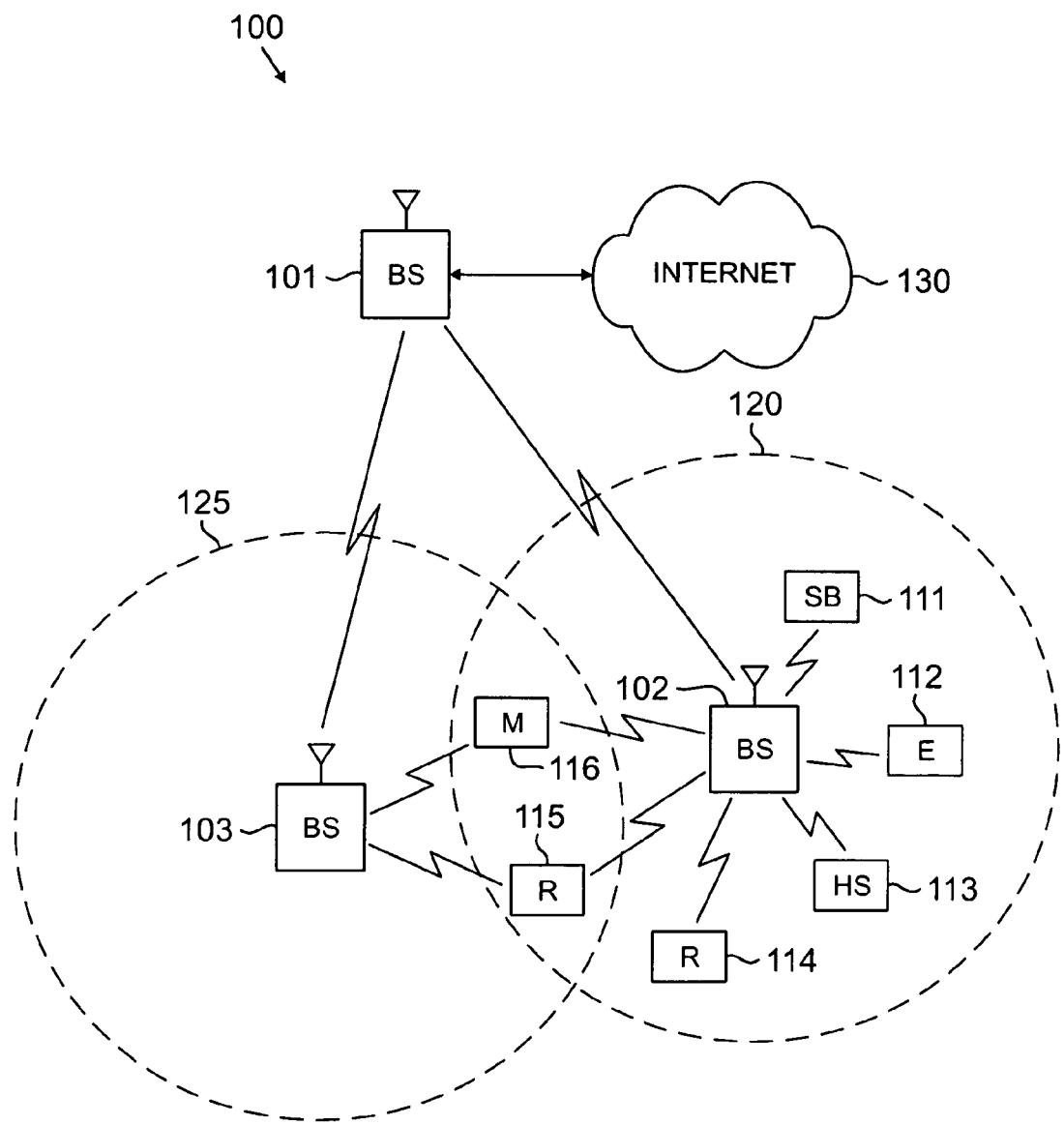
FIG. 1 illustrates an exemplary wireless network that reduces the peak-to-average power ratio (PAPR) or crest factor of OFDM or OFDMA signals according to the principles of the present disclosure.

FIG. 1 illustrates exemplary wireless network 100, which reduces peak-to-average power ratio (PAPR) of multi-carrier signals, such as OFDM and OFDMA signals, according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
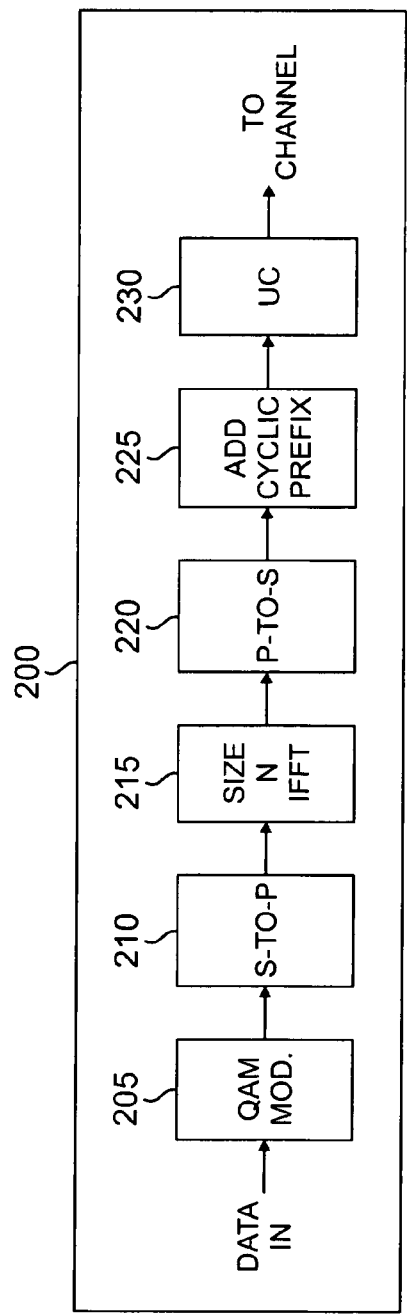
FIG. 2A is a high level block diagram of a conventional orthogonal frequency division multiple access (OFDMA) transmitter according to one embodiment of the prior art.
Figure 2B:
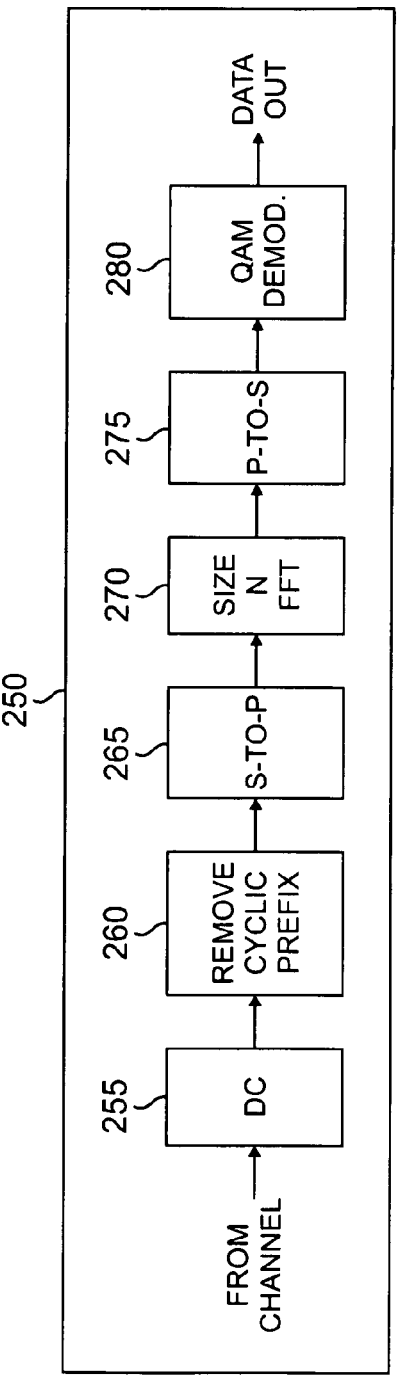
FIG. 2B is a high level block diagram of a conventional orthogonal frequency division multiple access (OFDMA) receiver according to one embodiment of the prior art.

FIG. 2A is a high-level diagram of conventional orthogonal frequency division multiple access (OFDMA) transmitter 200. FIG. 2B is a high-level diagram of conventional orthogonal frequency division multiple access (OFDMA) receiver 250. OFDMA transmitter 200 comprises quadrature amplitude modulation (QAM) modulator 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. OFDMA receiver 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and quadrature amplitude modulation (QAM) demodulator 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the values of Size M and Size N may be modified according to the implementation.

Furthermore, although the text and FIGS. 1-12 of the disclosure are directed to an embodiment that implements the Fast Fourier Transform and the Inverse Fast Fourier Transform, this is by way of illustration only and should not be construed to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the values of the M and N variables may be any integer numbers (i.e., 1, 2, 3, 4, etc.), while for FFT and IFFT functions, the values of the M and N variables may be any integer numbers that are powers of two (i.e., 1, 2, 4, 8, 16, etc.).

In OFDMA transmitter 200, QAM modulator 205 receives a set of information bits and modulates the input bits to produce a sequence of frequency-domain modulation symbols. Serial-to-parallel block 210 converts (i.e., de-multiplexes) the serial QAM symbols to parallel data to produce N parallel symbol streams where N is the IFFT/FFT size used in transmitter 200 and receiver 250. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal.

Finally, up-converter 230 modulates (i.e., up-converts) the output of add cyclic prefix block 225 to RF frequency for transmission via a wireless channel. The signal may also be filtered at baseband before conversion to RF frequency. The time-domain signal transmitted by OFDMA transmitter 200 comprises multiple overlapping sinusoidal signals corresponding to the data symbols transmitted. This results in a large peak-to-average power ratio (PAPR) at the transmitter amplifier and requires significant transmit power back-offs.

The transmitted RF signal arrives at OFDMA receiver 250 after passing through the wireless channel and reverse operations to those at OFDMA transmitter 200 are performed. Down-converter 255 down-converts the received signal to baseband frequency and remove cyclic prefix 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of QAM data symbols. QAM demodulator 280 then demodulates the QAM symbols to recover the original input data stream.

Figure 3:
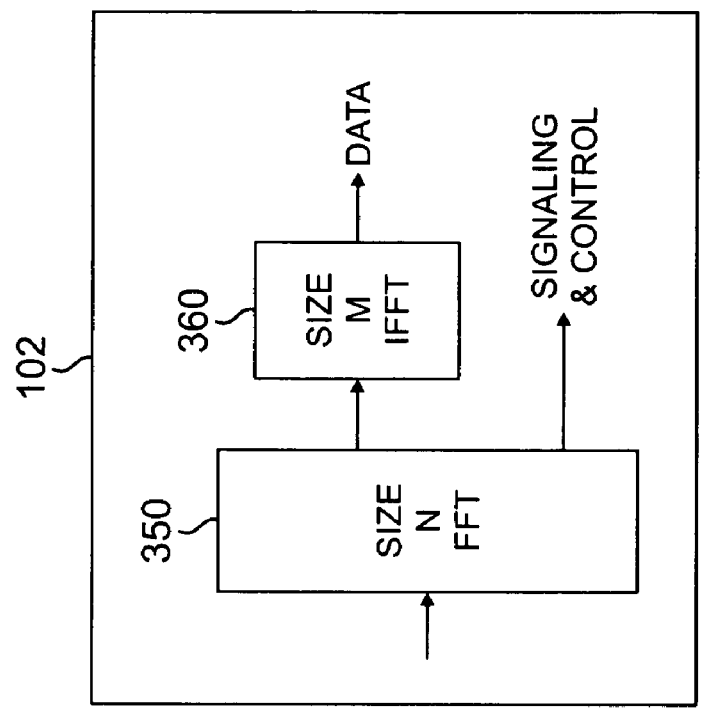
FIG. 3 illustrates selected portions of a subscriber station and a base station that implement power-efficient multiplexing for reducing the peak-to-average power ratio (PAPR) or crest factor of OFDM or OFDMA signals according to the principles of the present disclosure.
Figure 3:
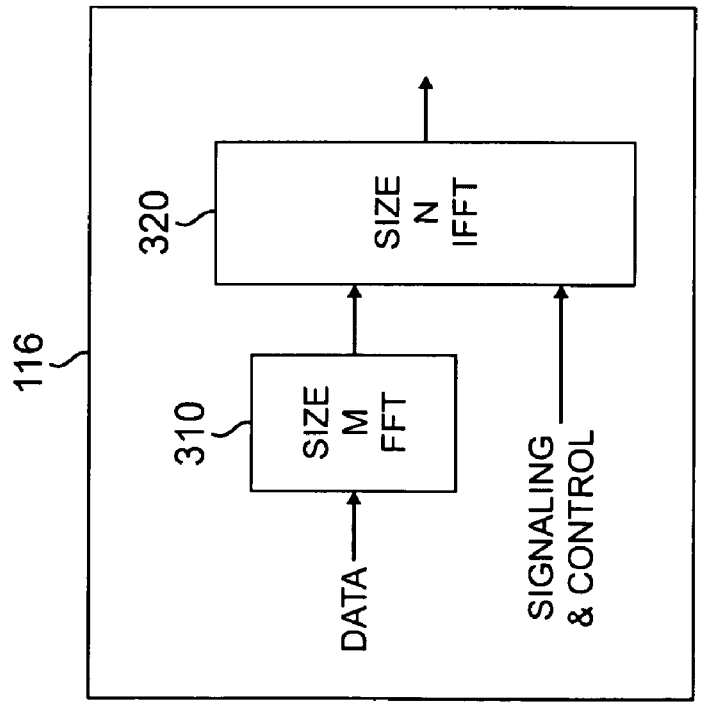

FIG. 3 illustrates selected portions of subscriber station 116 and base station 102, which implement power-efficient FFT pre-coding for reducing the peak-to-average power ratio (PAPR) of OFDMA signals according to the principles of the present disclosure. Subscriber station 116 comprises Size M Fast Fourier Transform (FFT) block 310 and Size N Inverse Fast Fourier Transform (IFFT) block 320. Base station 102 comprises Size N Fast Fourier Transform (FFT) block 350 and Size M Inverse Fast Fourier Transform (IFFT) block 360. According to the principles of the disclosure, prior to the IFFT operation in subscriber station 116, at least a portion of the user data traffic and/or the pilot, signaling, and other control signals are pre-coded by means of an FFT operation in order to reduce the PAPR of the transmitted signal.

In FIG. 3, Size M FFT block 310 pre-codes at least some of the data traffic by performing a size M FFT operation. The FFT pre-coded data are then mapped to a subset of the OFDMA subcarriers (i.e., tones) and a size N IFFT operation is performed, where N is greater than or equal to M. The FFT pre-coding performed by Size M FFT block 310 results in a time-domain signal that has relatively lower PAPR, thus making efficient use of the capacity of the power amplifier (not shown) in subscriber station 116. In FIG. 3, the signaling and control information, such as pilot signals, are directly mapped to the OFDM subcarriers without FFT pre-coding. In general, signaling and control information is transmitted at lower power than user data symbols and thus contributes less to the overall PAPR.

In base station 102, Size N FFT block 350 performs a size N FFT operation on the received signal to recover the FFT pre-coded data and the non-coded signaling and control information. The data symbols may be equalized (not shown) in the frequency-domain using the frequency-domain pilot information. After equalization, Size M IFFT block 360 performs an IFFT operation on the equalized pre-coded symbols to recover the original user data traffic.

Figure 4:
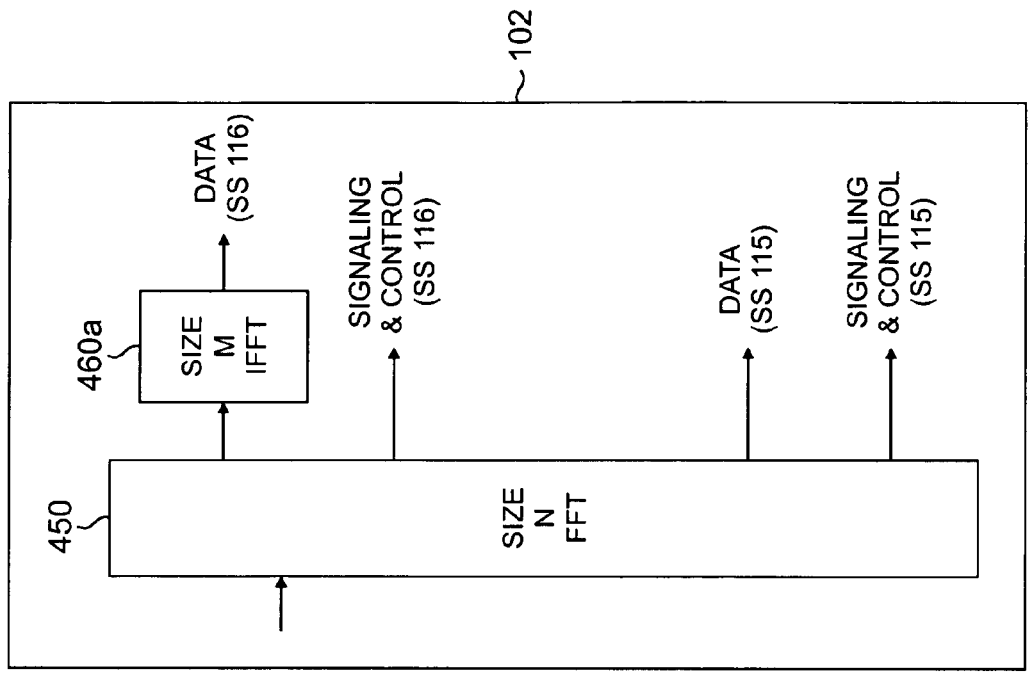
FIG. 4 illustrates selected portions of subscriber stations and a base station in which selective FFT pre-coding of data in a power-limited subscriber station is implemented according to the principles of the present disclosure.
Figure 4:
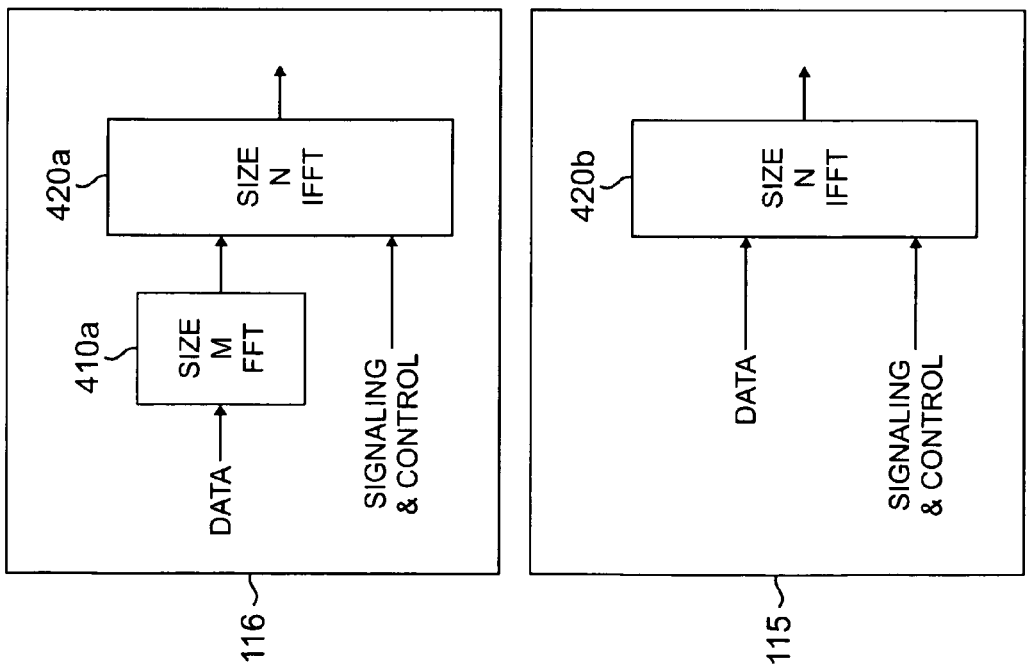

FIG. 4 illustrates selected portions of subscriber stations 116 and 115 and base station 102 in which selective FFT pre-coding of data in power-limited subscriber station 116 is implemented according to the principles of the disclosure. Subscriber station (SS) 116 comprises Size M Fast Fourier Transform (FFT) block 410a and Size N Inverse Fast Fourier Transform (IFFT) block 420a. Subscriber station (SS) 115 comprises Size N Inverse Fast Fourier Transform (IFFT) block 420b. Base station (BS) 102 comprises Size N Fast Fourier Transform (FFT) block 450 and Size M Inverse Fast Fourier Transform (IFFT) block 460.

In FIG. 4, SS 116 is power-limited (e.g., near cell edge) and must perform FFT pre-coding. However, SS 115 is not power-limited (e.g., near BS 102) and the FFT pre-coding step is omitted. Hence, the data in SS 115 is directly mapped to the OFDM subcarriers. The signal from SS 115 may result in potentially higher PAPR. However, SS 115 can back-off the transmit power in the uplink from its peak power because SS 115 has excess power headroom available.

SS 116 uses a control message to indicate to BS 102 that SS 116 is operating in power limited mode. Similarly, SS 115 may indicate to BS 102 that SS 115 is not operating in power-limited mode. Thus, BS 102 knows which subscriber stations are using FFT pre-coding and which subscriber stations are not. As a result, in base station 102, Size N FFT block 450 performs a size N FFT operation on the received signal to recover the incoming signals from SS 115 and SS 115. However, Size M IFFT block 460a performs an IFFT operation only on FFT pre-coded data from SS 116. The signaling and control information from SS 116 and the data traffic and signaling and control information from SS 115 are recovered directly from the outputs of Size N FFT block 450.

FIG. 5A is a high level block diagram of subscriber station 116, which implements FFT pre-coding according to the principles of the present disclosure. FIG. 5B is a high level block diagram of base station 102, which supports FFT pre-coded data according to the principles of the present disclosure. Subscriber station 116 comprises channel coding and QAM modulation block 505, Size M FFT block 510, M subcarriers (SC) mapping block 515, Size N IFFT block 520, and add cyclic prefix block 525. Base station 102 comprises remove cyclic prefix block 555, Size N FFT block 560, M subcarriers demapping block 565, Size M IFFT block 570, and channel decoding and QAM demodulation block 575.

Channel coding and QAM modulation block 505 receives incoming data traffic bits and performs channel coding (e.g., turbo coding, Viterbi coding, etc.) and modulation to produce a stream of symbols. Size M FFT block 510 then FFT pre-codes the data symbols by performing a size M FFT operation. After the FFT operation, M subcarrier mapping block 515 maps the FFT pre-coded symbols to M subcarriers out of a total of N subcarriers at the inputs of Size N IFFT block 520. Any additional control information, such as a pilot signal, is also mapped to predetermined subcarriers inputs of Size N IFFT block 520. Next, Size N IFFT block 520 performs a size N IFFT operation to generate a time domain signal. Add cyclic prefix block 525 adds a cyclic prefix to the time-domain signal from Size N IFFT block 520 before up-conversion (not shown) to the RF frequency for transmission.

A sequence of reverse operations is performed in base station (BS) 102. BS 102 comprises down-conversion circuitry (not shown) that generates a baseband signal from the received RF signal. After down-conversion, remove cyclic prefix block 555 removes the cyclic prefix from the time-domain baseband signal. Size N FFT block 560 converts the baseband signal to a frequency domain signal. The control and signaling information that was not FFT pre-coded is recovered directly from the outputs of Size N FFT block 560. M subcarriers demapping block 565 demaps the FFT pre-coded data from selected ones of the outputs of Size N FFT block 560 to the inputs Size M IFFT block 570. Size M IFFT block 570 receives the FFT pre-coded data traffic from M subcarriers demapping block 565 and performs a size M IFFT operation to recover the coded and modulated data symbols. Finally, channel decoding and QAM demodulation block 575 demodulates and decodes the data symbols to recover the original user data traffic bits.

Figure 6A:
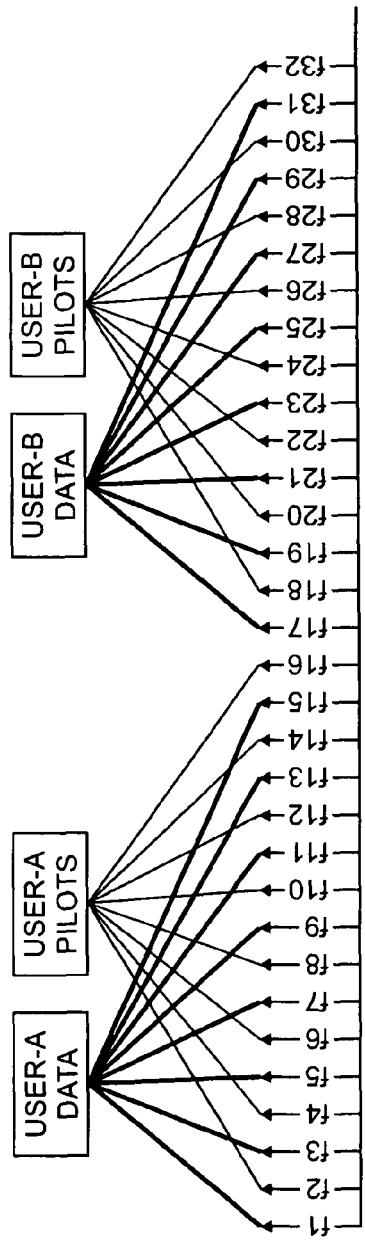
FIGS. 6A-6C illustrate the mapping of data signals and pilot signals to OFDM subcarriers according to different embodiments of the present disclosure.
Figure 6B:
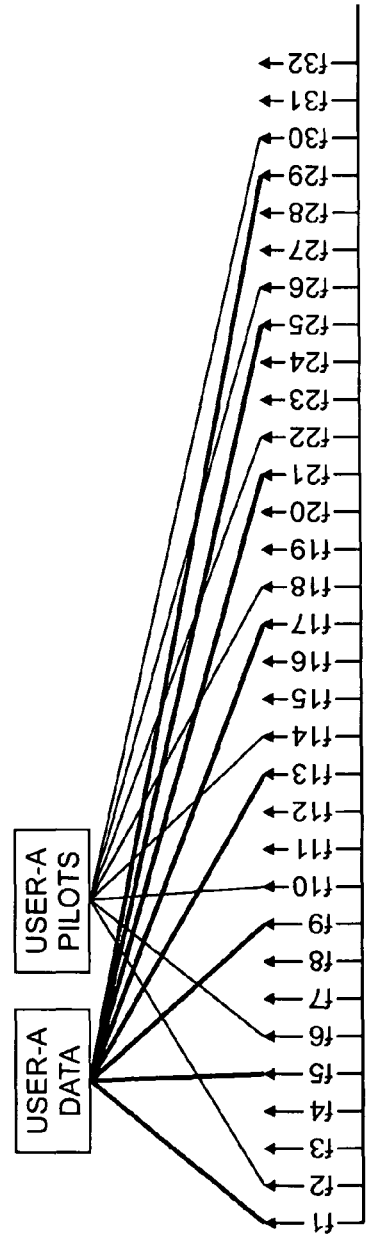
Figure 6C:
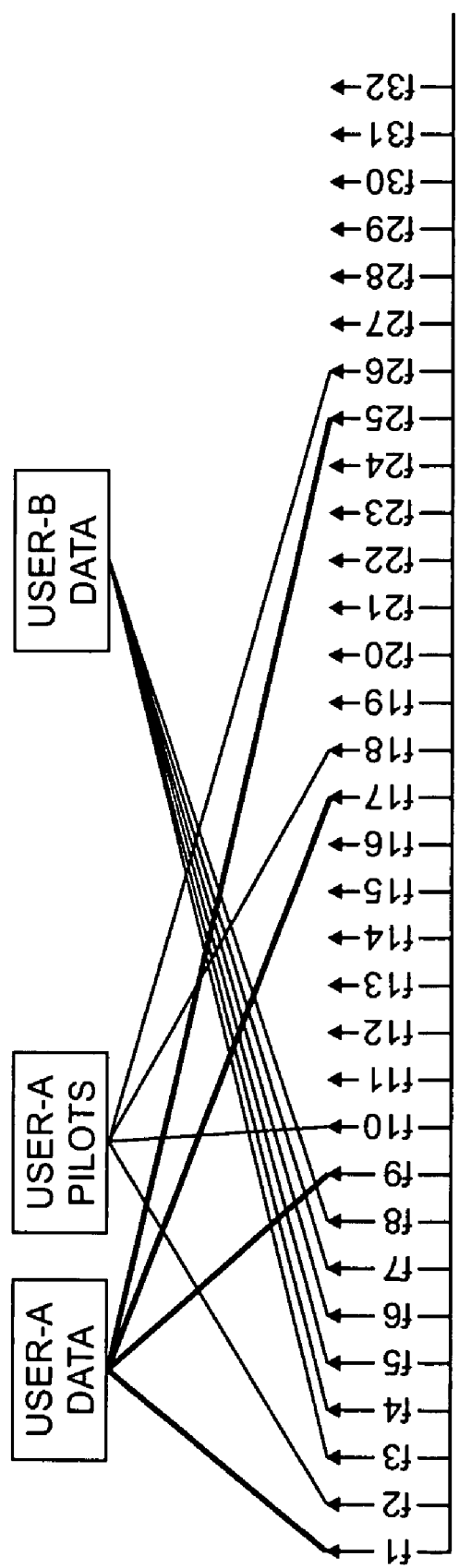

FIGS. 6A-6C illustrate the mapping of data signals and pilot signals to OFDM/OFDMA subcarriers according to different embodiments of the present disclosure. FIG. 6A illustrates the mapping of data and pilot symbols to selected subsets of thirty-two (32) subcarriers for FFT pre-coding. In this example, both User A (e.g., SS 116) and User B (e.g., SS 116) use 16 subcarriers each for data and pilot signal out of a total of 32 subcarriers. The first 16 subcarriers are used by User A and the remaining 16 subcarriers are used by User B. Also, the pilot symbols are interspersed uniformly among the data symbols.

FIG. 6B illustrates another mapping of data and pilot symbols to selected subsets of thirty-two (32) subcarriers for FFT pre-coding. In FIG. 6B, the data symbols for User-A and the pilot symbols for User A are scattered uniformly (interspersed) over the whole bandwidth of the 32 subcarriers. User A data symbols uses subcarrier frequencies f1, f5, f9, f13, f17, f21, f25 and f29 and User A pilot symbols use subcarrier frequencies f2, f6, f10, f14, f18, f22, f26 and f30. Similarly, User B data symbols and pilot symbols (not shown) are over the remaining subcarriers in FIG. 6B. Interspersing the data and pilot signals of different users achieves frequency-diversity because the data for both User A and User B are scattered over the whole bandwidth.

FIG. 6C illustrates another mapping of data and pilot symbols to selected subsets of thirty-two (32) subcarriers for FFT pre-coding. In this embodiment, User A is power-limited and the User A FFT pre-coded data is uniformly distributed over subcarriers in the whole frequency band used (i.e., on subcarriers f1, f9, f17 and f25. The mapping of FFT-coded data in this way results in a time-domain signal after the IFFT operation that has low PAPR. User B is not power-limited and User B maps FFT pre-coded data to a contiguous set of subcarriers (e.g., subcarriers f3, f4, f5, f6, f7 and f8). The mapping of FFT pre-coded data to a contiguous set of subcarriers results in relatively larger PAPR. However, since user-B is not power limited, User B can back-off its power amplifier appropriately in order to satisfy the higher PAPR constraint.

Figure 7:
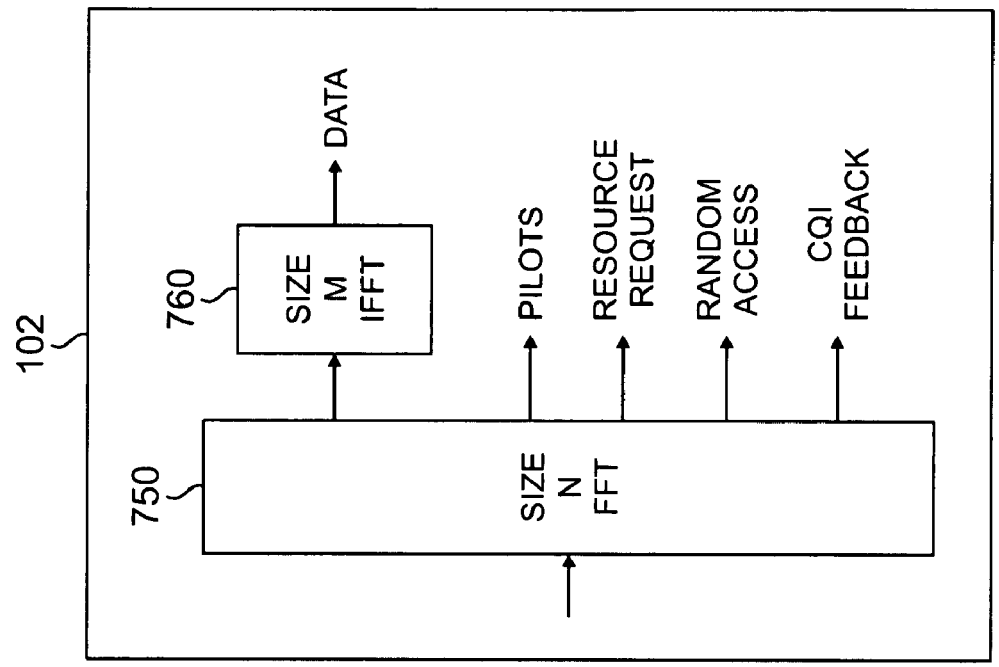
FIG. 7 illustrates selected portions of a subscriber station and a base station that implement selective FFT pre-coding of data according to one embodiment of the present disclosure.
Figure 7:
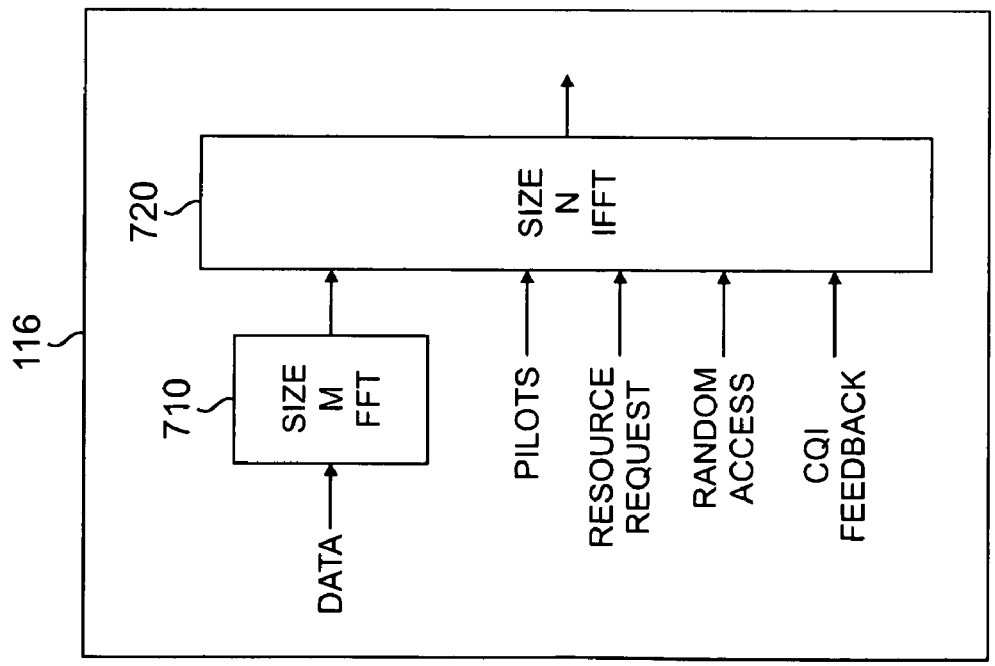

FIG. 7 illustrates selected portions of subscriber station 116 and base station 102 that implement selective FFT pre-coding of data according to one embodiment of the present disclosure. In this embodiment, Size M FFT block 710 pre-codes user data and Size N IFFT block 720 performs an IFFT operation (i.e., multiplexes) on the FFT pre-coded data and the non-FFT pre-coded signaling information, namely the pilot signals, resource request signals, random access signals, and channel quality indicator (CQI) feedback signals. Other kinds of control information, such as acknowledgment (ACK) feedback or negative acknowledgment (NACK) feedback for hybrid ARQ operation may be multiplexed using the teachings of this invention. In BS 102, Size N FFT block 750 recovers the FFT pre-coded data and the non-FFT pre-coded pilot signals, resource request signals, random access signals and channel quality indicator (CQI) feedback signals. Size M IFFT block 760 then recovers the original data symbols from the FFT pre-coded data.

Figure 8:
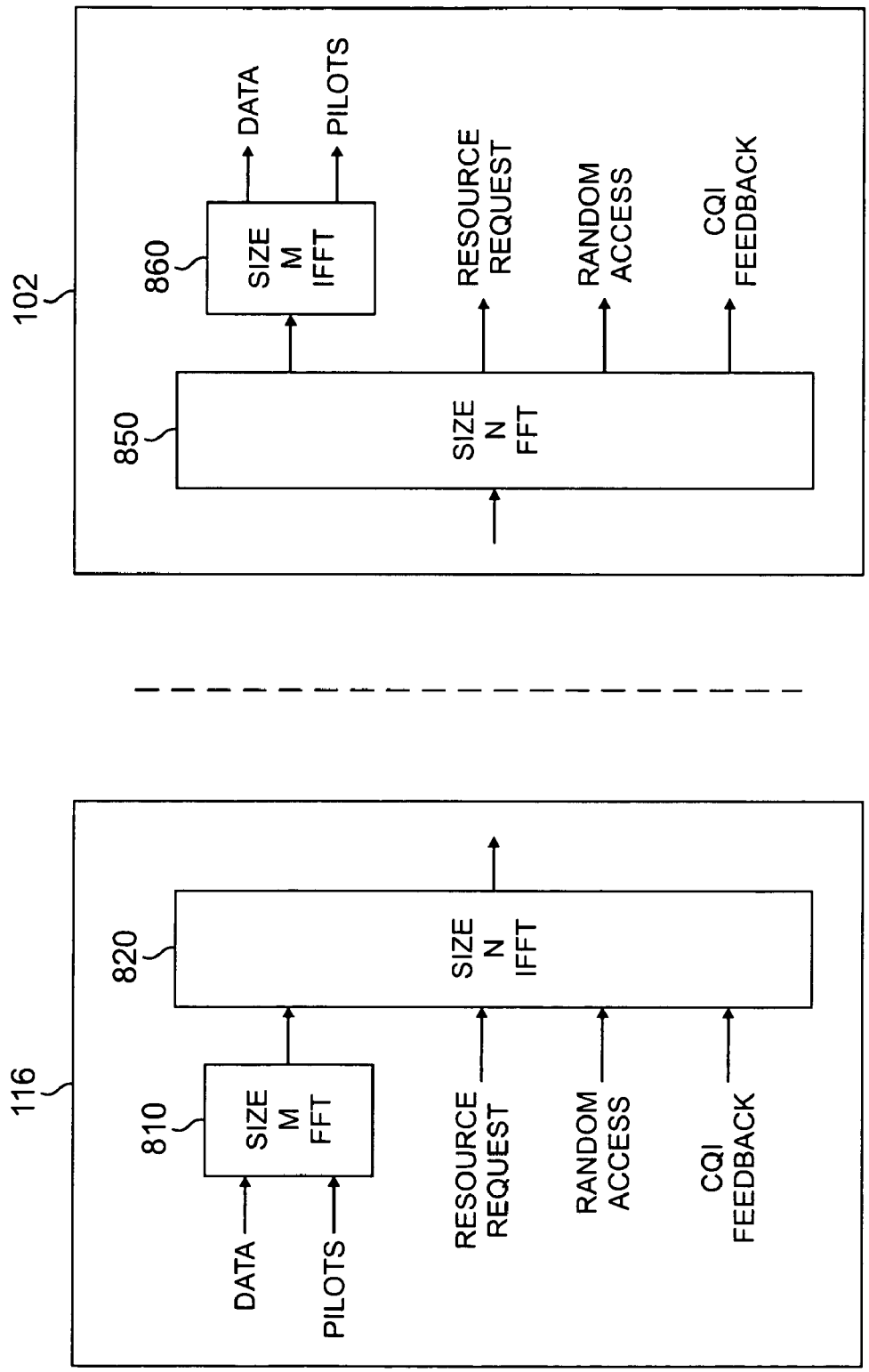
FIG. 8 illustrates selected portions of a subscriber station and a base station that implement selective FFT pre-coding of data according to another embodiment of the present disclosure.

FIG. 8 illustrates selected portions of subscriber station 116 and base station 102 that implement selective FFT pre-coding of data according to another embodiment of the present disclosure. In this embodiment, Size M FFT block 810 pre-codes not only the user data, but also FFT pre-codes some of the control and signaling information—in this case, the pilot signal(s). Size N IFFT block 820 then performs an IFFT operation (i.e., multiplexes) the FFT pre-coded data, the FFT pre-coded pilot signal, and the non-FFT pre-coded resource request signals, random access signals and channel quality indicator (CQI) feedback signals. In BS 102, Size N FFT block 850 recovers the FFT pre-coded data, the FFT pre-coded pilot signal(s), and the non-FFT pre-coded resource request signals, random access signals, and channel quality indicator (CQI) feedback signals. Size M IFFT block 860 then recovers the original data symbols from the FFT pre-coded data and the original pilot signal(s) from the FFT pre-coded pilot signal.

Figure 9:
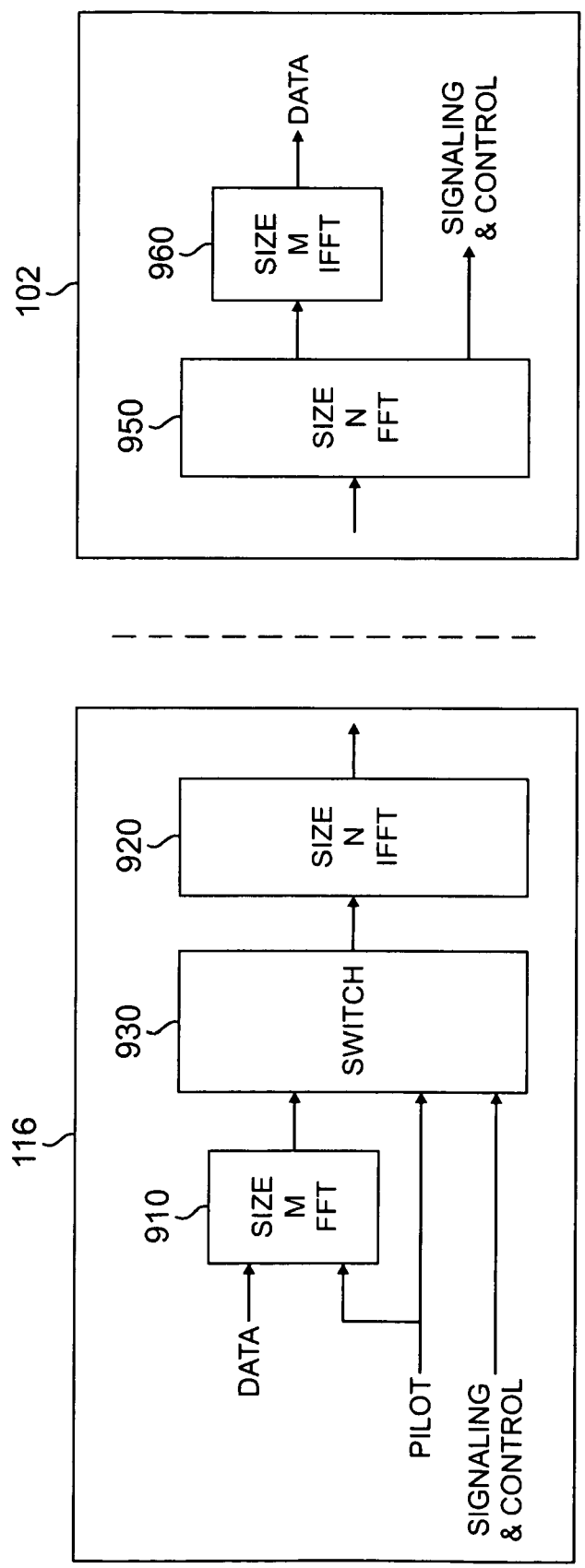
FIG. 9 illustrates selected portions of a subscriber station and a base station that implement time-multiplexing of FFT pre-coded data with signaling and control information according to another embodiment of the present disclosure.
Figure 10:
FIG. 10 illustrates time-multiplexed FFT pre-coded data and signaling and control information.

FIG. 9 illustrates selected portions of subscriber station 116 and base station 102 that implement time-multiplexing of FFT pre-coded data with signaling and control information according to another embodiment of the present disclosure. FIG. 10 illustrates time-multiplexed FFT pre-coded data and signaling and control information. SS 116 comprises Size M FFT block 910, Size N IFFT block 920 and switch 930. Switch 930 provides the ability to implement time-multiplexing. BS 102 comprises Size N FFT block 950 and Size M IFFT block 960.

At a given time, switch 930 enables either the transmission of FFT pre-coded data from Size M FFT block 910 or the transmission of signaling and control information. This is illustrated in FIG. 10. The transmission of signaling and control information is interrupted when data needs to be transmitted so that required resources for data can be allocated.

Figure 11:
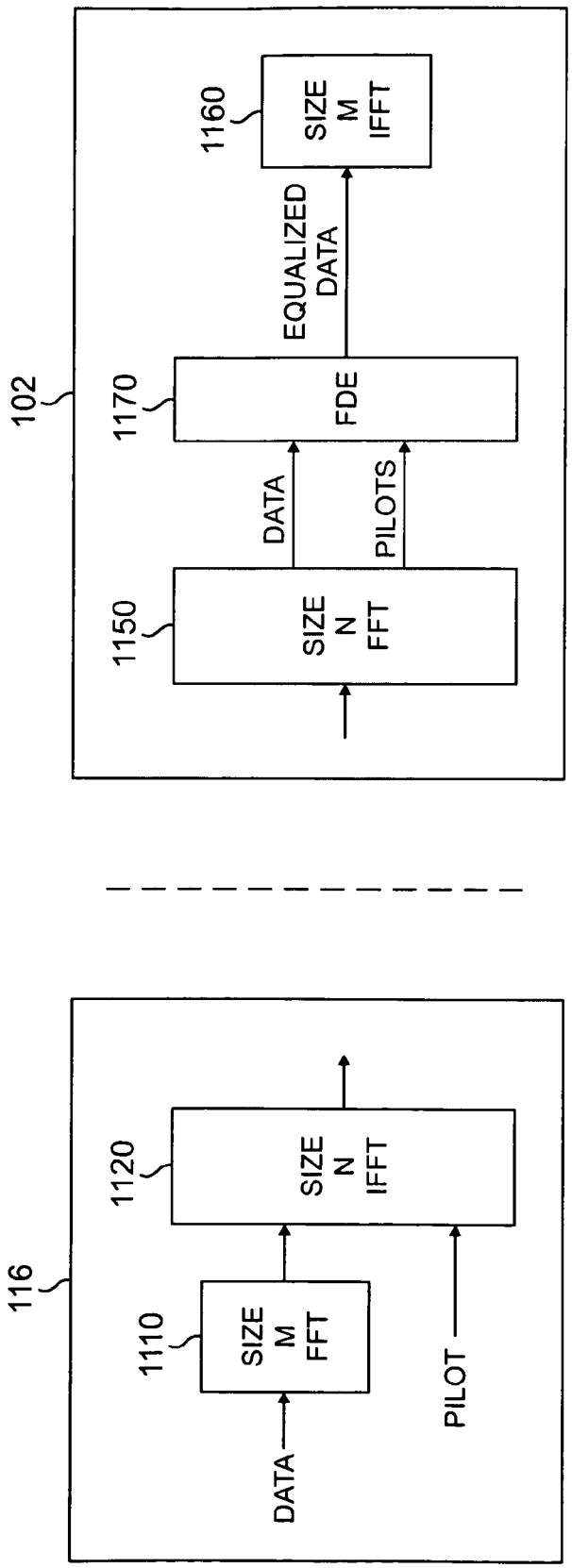
FIG. 11 illustrates selected portions of a subscriber station and a base station that implement selective FFT pre-coding of data and frequency domain equalization (FDE) according to another embodiment of the present disclosure.

FIG. 11 illustrates selected portions of subscriber station (SS) 116 and base station (BS) 102 that implement selective FFT pre-coding of data and frequency domain equalization (FDE) according to another embodiment of the present disclosure. SS 116 comprises Size M FFT block 1110 and Size N IFFT block 1120. BS 102 comprises Size N FFT block 1150, Size M IFFT block 1160, and frequency domain equalizer (FDE) 1170.

Size M FFT block 1110 pre-codes the data traffic by performing a size M FFT operation. The FFT pre-coded data are then mapped to a subset (=M) of the OFDMA subcarriers (i.e., tones) and Size N IFFT block 1120 performs a size N IFFT operation (N>M) on the FFT pre-coded data symbols, the pilot signal, and other signaling and control information not shown. The pilot signal and other control and signaling information are directly mapped to the OFDM subcarriers without FFT pre-coding.

In base station 102, Size N FFT block 1150 performs a size N FFT operation on the received signal to recover the FFT pre-coded data, the non-FFT pre-coded pilot signal, and the other non-FFT pre-coded signaling and control information (not shown). Next, FDE 1170 uses the recovered pilot signal to equalize the FFT pre-coded data in the frequency-domain. The received frequency-domain pilot information is used for channel estimation and equalization purposes. It is noted that the pilot symbols were inserted in SS 116 just before the IFFT operation, so that FFT pre-coding is not used for the pilot symbols. Therefore, pilot symbol transmission happens in the frequency-domain. This assures that a reliable channel estimate is available in the frequency-domain for frequency-domain equalization. Finally, Size M IFFT block 1160 converts the equalized data symbols from the frequency domain to the time domain.

Figure 12:
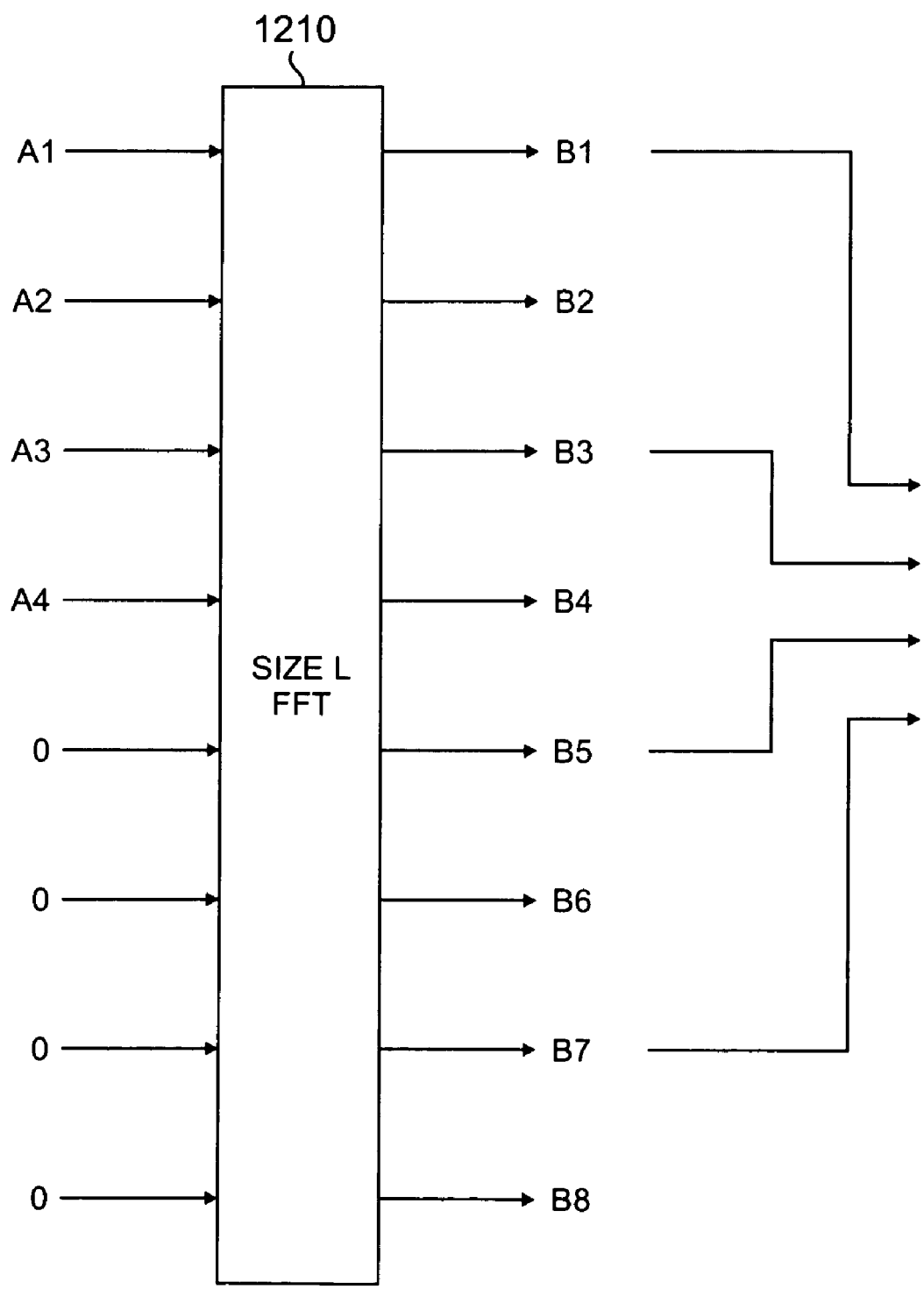
FIG. 12 illustrates FFT pre-coding of data according to an exemplary embodiment of the present disclosure.

FIG. 12 illustrates FFT pre-coding of data according to an exemplary embodiment of the present disclosure. In the example, it is desired to perform a size K=4 FFT pre-coding operation using Size L FFT block 1210, where L=8. A size K FFT operation can be performed using Size L FFT block 1210 by mapping the K input symbols into K contiguous inputs of the total of L inputs. The remaining (L−K) inputs of Size L FFT block 1210 are set to 0. The K outputs are obtained by reading every L/K output as illustrated in FIG. 12. For the case of K=4 and L=8, this means reading every second output (i.e., every other output). Therefore, any data FFT pre-coding of size K (limited by the maximum FFT size L) may be done to match the amount of data to be transmitted from a subscriber station and to match the number of subcarriers allocated to the subscriber station.

As noted above, in an alternate embodiment of the present disclosure, Discrete Fourier Transform (DFT) functions and Inverse Discrete Fourier Transform (IDFT) functions may be used in lieu of Fast Fourier Transform functions and Inverse Fast Fourier Transform, respectively. In such an embodiment, the FFT blocks and the IFFT blocks in the figures above may be replaced by DFT blocks and IDFT blocks.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a subscriber station capable of communicating with the wireless network according to a multi-carrier protocol, the subscriber station comprising:
   a size M Fourier Transform (FT) block capable of receiving input symbols and generating therefrom M FT pre-coded outputs, the input symbols comprising data signals and pilot signals; and
   a size N inverse Fourier Transform (IFT) block capable of receiving N inputs, the N inputs including the M FT pre-coded outputs from the size M FT block, and generating therefrom N outputs to be transmitted to a base station of the wireless network, wherein the size M FT block and the size N IFT block are one of: 1) a Fast Fourier Transform (FFT) block and an inverse Fast Fourier Transform (IFFT) block; and 2) a Discrete Fourier Transform (DFT) block and an inverse Discrete Fourier Transform (IDFT) block,
   wherein the data signals and pilot signals are mapped to alternating subcarriers and the size N IFT block receives signaling and control information on at least some of the N inputs other than the M FT pre-coded outputs.

2. The subscriber station as set forth in claim 1, wherein the signaling and control information comprises a pilot signal.

3. The subscriber station as set forth in claim 1, wherein the size N IFT block receives only the M FT pre-coded outputs during selected time slots and receives only the signaling and control information during other selected time slots.

4. The subscriber station as set forth in claim 1, wherein the multi-carrier protocol comprises one of orthogonal frequency division multiplexing and orthogonal frequency division multiple access.

5. The subscriber station as set forth in claim 1, wherein the input symbols further comprise a pilot signal.

6. The subscriber station as set forth in claim 5, wherein the size N IFT block receives signaling and control information on at least some of the N inputs other than the M FT pre-coded outputs.

7. The subscriber station as set forth in claim 6, wherein the size N IFT block receives only the M FT pre-coded outputs during selected time slots and receives only the signaling and control information during other selected time slots.

8. The subscriber station as set forth in claim 7, wherein the signaling and control information comprises a pilot signal.

9. The subscriber station as set forth in claim 6, wherein the multi-carrier protocol comprises one of orthogonal frequency division multiplexing and orthogonal frequency division multiple access.

10. For use in a subscriber station capable of communicating with a wireless network according to a multi-carrier protocol, a method for reducing the peak-to-average power ration (PAPR) of a radio frequency signal transmitted by the subscriber station to a base station of the wireless network, the method comprising the steps of:
receiving input symbols to be transmitted to the base station, the input symbols comprising data signals and pilot signals;
performing a size M Fourier Transform (FT) operation on the received input symbols to thereby generate M FT pre-coded outputs; and
performing a size N inverse Fourier Transform (IFT) operation on N inputs, the N inputs including the M FT pre-coded outputs, to thereby generate N outputs to be transmitted to the base station, wherein the size M FT operation and the size N IFT operation are one of: 1) a Fast Fourier Transform (FFT) operation and an inverse Fast Fourier Transform (IFFT) operation; and 2) a Discrete Fourier Transform (DFT) operation and an inverse Discrete Fourier Transform (IDFT) operation
mapping the data signals and pilot signals to alternating subcarriers, wherein the size N IFT operation receives signaling and control information on at least some of the N inputs other than the M FT pre-coded outputs.

11. The method as set forth in claim 10, wherein the signaling and control information comprises a pilot signal.

12. The method as set forth in claim 10, wherein the size N IFT operation is performed only on the M FT pre-coded outputs during selected time slots and is performed only on the signaling and control information during other selected time slots.

13. The method as set forth in claim 10, wherein the multi-carrier protocol comprises one of orthogonal frequency division multiplexing and orthogonal frequency division multiple access.

14. The method as set forth in claim 10, wherein the input symbols further comprise a pilot signal.

15. The method as set forth in claim 14, wherein the size N IFT operation receives signaling and control information on at least some of the N inputs other than the M FT pre-coded outputs.

16. The method as set forth in claim 15, wherein the size N IFT operation is performed only on the M FT pre-coded outputs during selected time slots and is performed only on the signaling and control information during other selected time slots.

17. The method as set forth in claim 16, wherein the signaling and control information comprises a pilot signal.

18. The method as set forth in claim 15, wherein the multi-carrier protocol comprises one of orthogonal frequency division multiplexing and orthogonal frequency division multiple access.

19. A base station for use in a wireless network capable of communicating with subscriber stations according to a multi-carrier protocol, the base station comprising:
down-conversion circuitry capable of receiving incoming radio frequency signals from the subscriber stations and generating therefrom a baseband signal;
a size N Fourier Transform (FT) block capable of receiving the baseband signal on N inputs and performing an FT operation to generate N outputs;
a size M Inverse Fourier Transform (IFT) block capable of receiving M of the N outputs of the size N FT block and performing a size M IFT operation on the M outputs to generate a plurality of data symbols transmitted by a first one of the subscriber stations, wherein the size N FT block and the size M IFT block are one of 1) a Fast Fourier Transform (FFT) block and an inverse Fast Fourier Transform (IFFT) block; and 2) a Discrete Fourier Transform (DFT) block and an inverse Discrete Fourier Transform (IDFT) block; and
a frequency-domain equalizer capable of receiving a pilot signal transmitted by the first subscriber station and using the pilot signal to perform frequency-domain equalization on the M outputs of the size N FT block prior to the size M IFT operation of the size M IFT block wherein the size N FT block generates on at least some of the N outputs signaling and control information transmitted by the first subscriber station.

20. The base station as set forth in claim 19, wherein the signaling and control information transmitted by the first subscriber station comprises the pilot signal.

21. The base station as set forth in claim 20, wherein the data symbols transmitted by the first subscriber station are pre-coded.

22. A method for use in base station of a wireless network capable of communicating with subscriber stations according to a multi-carrier protocol, the method comprising the steps of:
receiving incoming radio frequency (RF) signals from the subscriber stations;
down-converting the incoming RF signals to generate a baseband signal;
performing a size N Fourier Transform (FT) operation on the baseband signal to generate N outputs;
performing a size M Inverse Fourier Transform (IFT) operation on M of the N outputs of the size N FT operation to generate a plurality of data symbols transmitted by a first one of the subscriber stations, wherein the size N FT operation and the size M IFT operation are one of: 1) a Fast Fourier Transform (FFT) operation and an inverse Fast Fourier Transform (LEFT) operation; and 2) a Discrete Fourier Transform (DFT) operation and an inverse Discrete Fourier Transform (IDFT) operation; and
using a pilot signal transmitted by the first subscriber station to perform frequency-domain equalization on the M outputs of the size N FT operation prior to the size M IFT operation, wherein the size N FT operation generates on at least some of the N outputs signaling and control information transmitted by the first subscriber station.

23. The method as set forth in claim 22, wherein the signaling and control information transmitted by the first subscriber station comprises the pilot signal.

24. The method as set forth in claim 23, wherein the data symbols transmitted by the first subscriber station are pre-coded.

25. A wireless network comprising a plurality of base stations capable of communicating with subscriber stations according to a multi-carrier protocol, each of the base stations comprising:
- down-conversion circuitry capable of receiving incoming radio frequency signals from the subscriber stations and generating therefrom a baseband signal;
- a size N Fourier Transform (FT) block capable of receiving the baseband signal on N inputs and performing an IFT operation to generate N outputs;
- a size M Inverse Fourier Transform (IFT) block capable of receiving M of the N outputs of the size N FT block and performing a size M IFT operation on the M outputs to generate a plurality of data symbols transmitted by a first one of the subscriber stations, wherein the size N FT block and the size M IFT block are one of: 1) a Fast Fourier Transform (FFT) block and an inverse Fast Fourier Transform (IFFT) block; and 2) a Discrete Fourier Transform (DFT) block and an inverse Discrete Fourier Transform (IDFT) block; and
- a frequency-domain equalizer capable of receiving a pilot signal transmitted by the first subscriber station and using the pilot signal to perform frequency-domain equalization on the M outputs of the size N FT block prior to the size M IFT operation of the size M IFT block wherein the size N FT block generates on at least some of the N outputs signaling and control information transmitted by the first subscriber station.

26. The wireless network as set forth in claim 25, wherein the signaling and control information transmitted by the first subscriber station comprises the pilot signal.

27. The wireless network as set forth in claim 26, wherein the data symbols transmitted by the first subscriber station are pre-coded.

\* \* \* \* \*